(12) United States Patent
LoRegio

(10) Patent No.: US 6,915,034 B1
(45) Date of Patent: Jul. 5, 2005

(54) MULTICHANNEL OPTICAL MULTIPLEXING DEVICE USING A SINGLE LIGHT BANDPASS FILTER

(75) Inventor: Paul LoRegio, Penetang (CA)

(73) Assignee: Raytheon Company, Waltham, MA (US)

( * ) Notice: Subject to any disclaimer, the term of this patent is extended or adjusted under 35 U.S.C. 154(b) by 267 days.

(21) Appl. No.: 09/972,619

(22) Filed: Oct. 8, 2001

(51) Int. Cl.$^7$ .............................................. G02B 6/293
(52) U.S. Cl. ........................................ 385/24; 385/47
(58) Field of Search ..................... 385/24, 47; 359/589

(56) References Cited

U.S. PATENT DOCUMENTS

| | | | |
|---|---|---|---|
| 4,244,045 A | | 1/1981 | Nosu et al. |
| 4,904,043 A | | 2/1990 | Schweizer |
| 5,583,683 A | | 12/1996 | Scobey |
| 5,737,104 A | * | 4/1998 | Lee et al. ..................... 398/79 |
| 5,808,763 A | * | 9/1998 | Duck et al. ................... 398/79 |
| 5,889,904 A | | 3/1999 | Pan et al. |
| 5,917,626 A | * | 6/1999 | Lee ............................. 385/24 |
| 5,946,435 A | | 8/1999 | Zheng et al. |
| 6,008,920 A | * | 12/1999 | Hendrix ....................... 398/79 |
| 6,055,347 A | * | 4/2000 | Li et al. ...................... 385/34 |
| 6,292,298 B1 | * | 9/2001 | Glance ........................ 359/583 |
| 2001/0055442 A1 | * | 12/2001 | Whitehead et al. ........... 385/24 |
| 2003/0002101 A1 | * | 1/2003 | Kropp et al. ................. 385/24 |
| 2003/0095744 A1 | * | 5/2003 | Takano et al. ................ 385/24 |

* cited by examiner

Primary Examiner—Rodney Bovernick
Assistant Examiner—Mike Stahl
(74) Attorney, Agent, or Firm—William C. Schubert; Karl A. Vick

(57) ABSTRACT

An optical multiplexing device includes a light bandpass filter that passes a first light wavelength at a first angle of incidence and passes a second light wavelength at a second angle of incidence. In a demultiplexing version, a light source directs a first incident beam including light of the first wavelength and light of the second wavelength at the first angle of incidence onto the light bandpass filter. The light bandpass filter passes the light of the first wavelength therethrough and reflects a first reflected beam therefrom. A first light receptor and redirector receives the first reflected beam and redirects the first reflected beam back onto the light bandpass filter at the second angle of incidence as a second incident beam. The light bandpass filter passes the light of the second wavelength therethrough and reflects a second reflected beam therefrom. The principle may be extended to the demultiplexing of additional wavelengths of light from the incident beam.

10 Claims, 3 Drawing Sheets

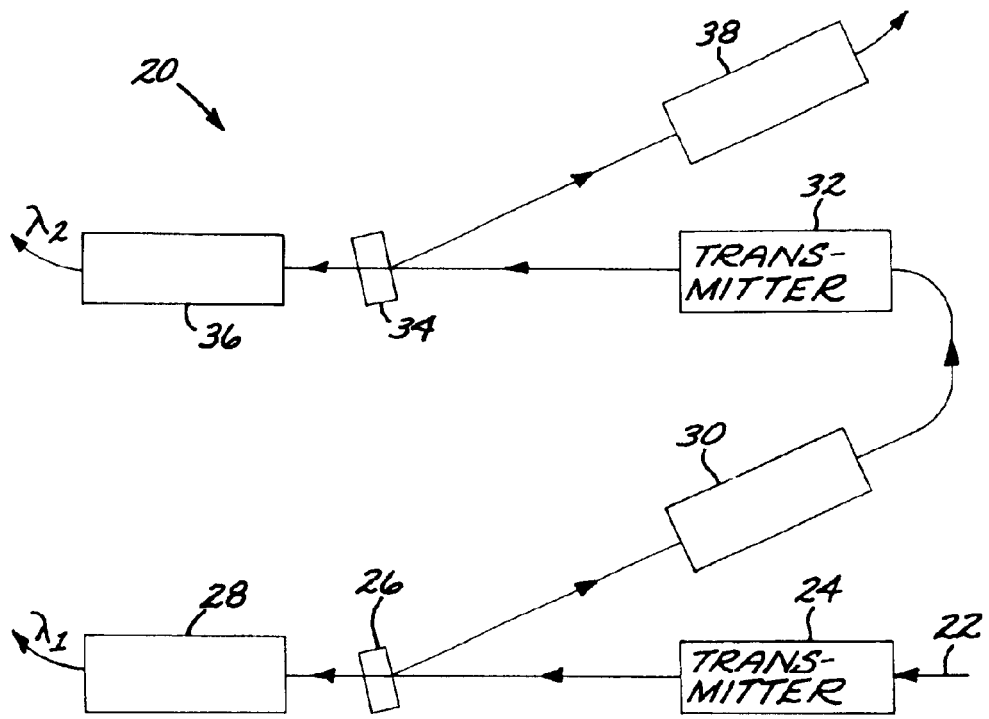
FIG. 1 PRIOR ART
FIG. 2
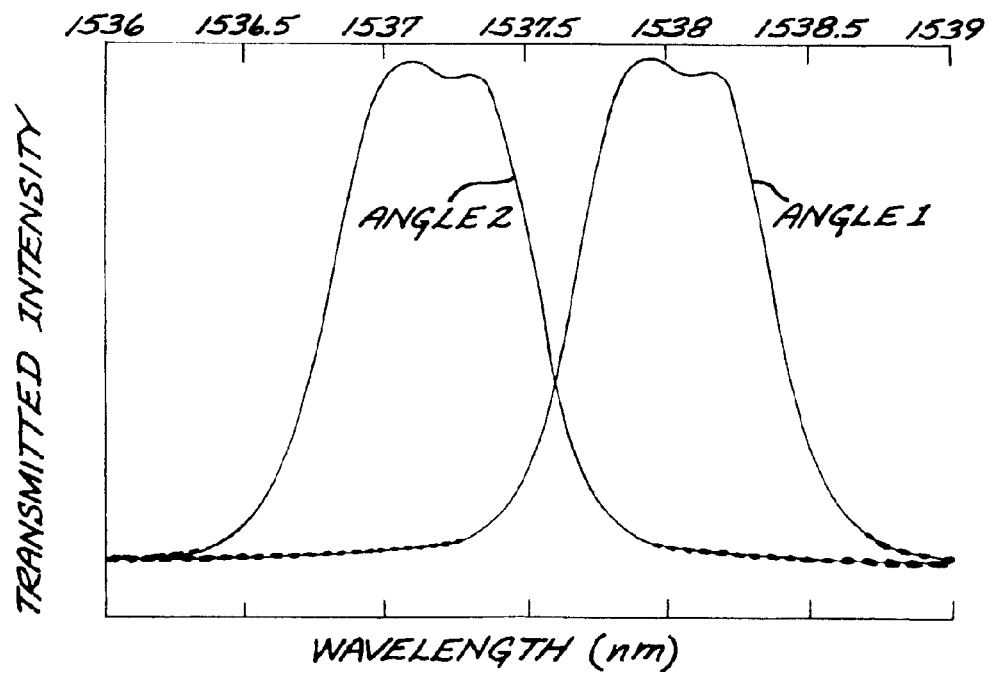

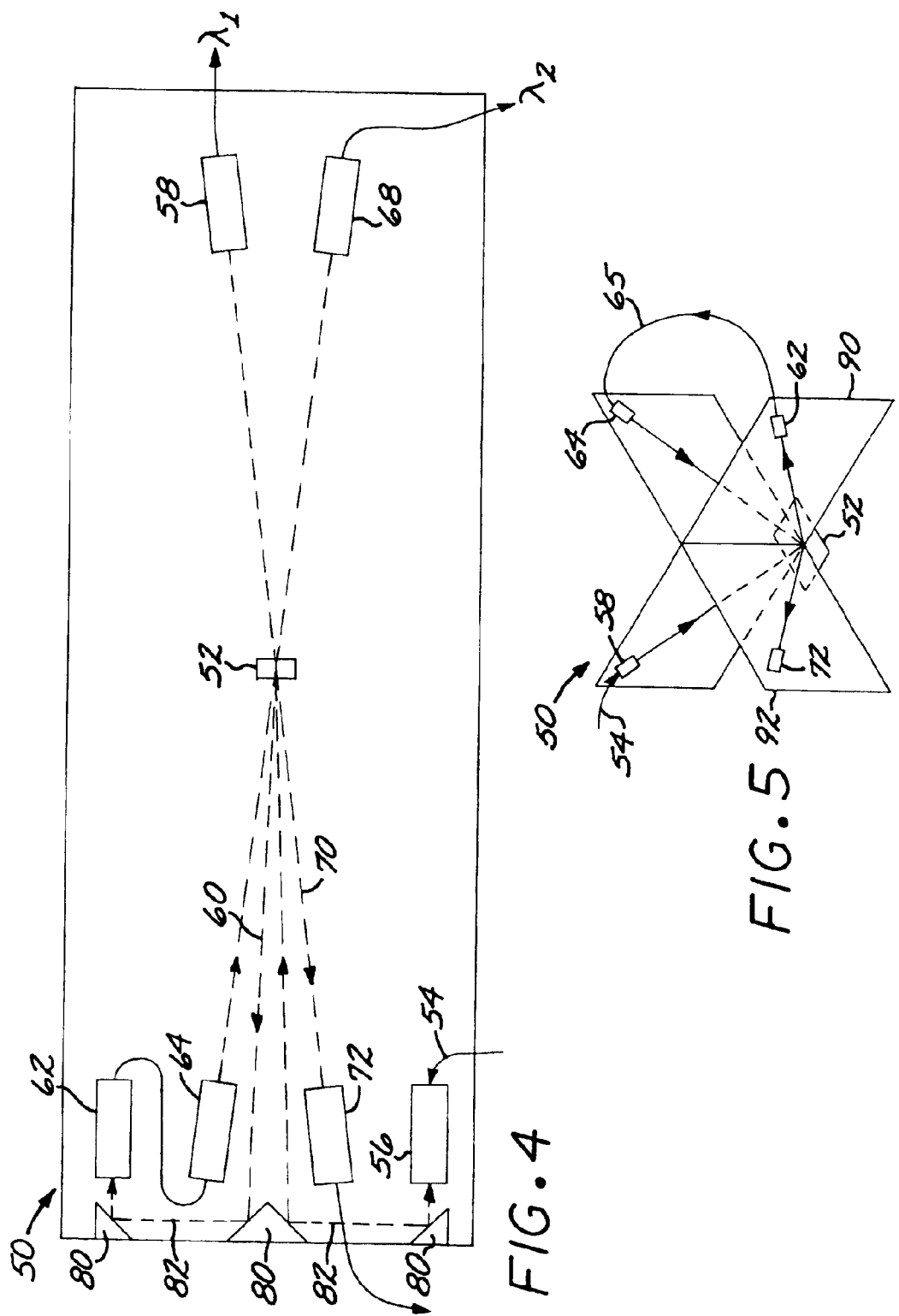

MULTICHANNEL OPTICAL MULTIPLEXING DEVICE USING A SINGLE LIGHT BANDPASS FILTER

This invention relates to optical communications and, more particularly, to an optical multiplexing device used in an optical communications system.

BACKGROUND OF THE INVENTION

In an optical communications system, information is encoded onto a light signal. The light signal is transmitted from one point to another, as for example by free-space light beams or optical fibers. At the receiving end, the information is read from the light signal.

An important advantage of optical communications is that a number of different light signals of different wavelengths may be mixed together (multiplexed) into a single light beam in a technique known as wavelength division multiplexing (WDM). Each light signal of a different wavelength, or channel, has information encoded onto it prior to the mixing of the channels. At the receiving end, the channels are separated, or demultiplexed, according to their wavelengths. The information on each channel is read from the demultiplexed light of that wavelength. A single multiplexed light beam may therefore carry many times the information that may be transmitted by a non-multiplexed light beam.

The multiplexing and/or demultiplexing may be accomplished using a series of light bandpass filters. Each filter is formed as a substrate and a multilayer dielectric light-transmissive optical stack deposited upon the substrate. The bandpass filter transmits only light of a specific wavelength. In the demultiplexing function, for example, when a multichannel beam is incident upon the filter, the light channel associated with the bandpass range is transmitted through the filter to a light receiver behind the filter. The beam with the remaining channels is reflected to another filter, where the next channel is extracted from the beam in a similar fashion, and so on until all of the channels of information carried by the light beam have been separated for further processing.

As the number of channels transmitted on a light beam increases, the number of multiplexing and/or demultiplexing bandpass filters increases. The multiplexing device structure becomes increasingly more complex and unwieldy, as well as subject to loss of alignment due to thermal effects and other reasons as the size of the structure increases. There is accordingly a need for an approach which accomplishes the multiplexing and/or demultiplexing function in a more convenient manner, particularly for large numbers of channels on the light beam. The present invention fulfills this need, and further provides related advantages.

SUMMARY OF THE INVENTION

The present invention provides an optical multiplexing device that is based on the use of the established bandpass filter technology, yet reduces the number of light bandpass filters required to accomplish the mixing or the separation of the channels. Two or more wavelengths of light are mixed to form, or separated from, a light beam using a single light bandpass filter. The physical size of the light bandpass filter need not be increased to handle multiple channels of extraction. The number of channels of different wavelength that may be mixed into or extracted from the light beam is limited by the ability to pack the light source, light receptors, and light receivers around the light bandpass filter, and possibly by heating of the light bandpass filter if the light beam energy is sufficiently high. Reducing the number of light bandpass filters allows the multiplexing device structure to be made more compact, and also reduces the possibility of loss of alignment due to thermal or other effects.

In accordance with the invention, an optical multiplexing device comprises a light bandpass filter that passes a first light wavelength at a first angle of incidence and passes a second light wavelength at a second angle of incidence. A light source directs a first incident beam including light of the first light wavelength onto the light bandpass filter at the first angle of incidence. The light bandpass filter passes the light of the first wavelength therethrough and reflects a first reflected beam therefrom. A first light receptor and redirector receives one of the first transmitted beam and the first reflected beam as a first received beam, and redirects the first received beam back onto the light bandpass filter at the second angle of incidence as a second incident beam. The light bandpass filter reflects a second reflected beam therefrom.

In one form of the optical multiplexing device, the first incident beam includes light of the first light wavelength, and the first light receptor and redirector receives the first transmitted beam. The optical multiplexing device further includes a second light source that directs a second incident beam including light of the second light wavelength onto the light bandpass filter at the second angle of incidence, so that the light of the second light wavelength passes through the light bandpass filter and mixes with the second reflected beam. In another form of the optical multiplexing device, the first incident beam includes light of the first wavelength and light of the second wavelength, the first light receptor and redirector receives the first reflected beam, and the optical multiplexing device further includes a first light receiver positioned to receive the light of the first light wavelength after it passes through the light bandpass filter, and a second light receiver positioned to receive the light of the second light wavelength after it passes through the light bandpass filter.

The optical multiplexing device is preferably used as a light demultiplexer. In accordance with this embodiment of the invention, an optical multiplexing device comprises a light bandpass filter that passes a first light wavelength at a first angle of incidence and passes a second light wavelength at a second angle of incidence. The light bandpass filter is preferably formed as a substrate and a multilayer dielectric light-transmissive optical stack deposited upon the substrate. A light source directs a first incident beam including light of the first wavelength and light of the second wavelength at the first angle of incidence onto the light bandpass filter. The light bandpass filter passes the light of the first wavelength therethrough and reflects a first reflected beam therefrom. A first light receptor and redirector receives the first reflected beam and redirects the first reflected beam back onto the light bandpass filter at the second angle of incidence as a second incident beam. The light bandpass filter passes the light of the second wavelength therethrough and reflects a second reflected beam therefrom. There is also desirably a first light receiver positioned to receive the light of the first wavelength after it passes through the light bandpass filter, and a second light receiver positioned to receive the light of the second wavelength after it passes through the light bandpass filter.

The first light receptor preferably comprises a receiving collimator positioned to receive the first reflected beam, a redirecting collimator positioned to transmit the second incident beam, and an optical link from the receiving collimator to the redirecting collimator. The optical link may include a mirror, an optical fiber, or both.

These principles may be extended to the extraction of additional channels of different respective wavelengths from the light beam. The optical multiplexing device may therefore include the case where the light bandpass filter passes a third light wavelength at a third angle of incidence, the incident beam includes light of the third wavelength, and the optical multiplexing device further includes a second light receptor and redirector that receives the second reflected beam and redirects the second reflected beam back onto the light bandpass filter at the third angle of incidence as a third incident beam. The light bandpass filter passes the light of the third wavelength therethrough and reflects a third reflected beam therefrom. The first incident beam, the second incident beam, and the third incident beam may be coplanar or noncoplanar.

The present invention is based upon a recognition that the bandpass wavelength of the light bandpass filter is dependent upon the angle of incidence of the light beam upon the light bandpass filter. One channel at one wavelength is extracted by directing the light beam onto the light bandpass filter at the first angle of incidence, and the next channel is extracted by redirecting the beam (with the first channel removed) onto the light bandpass filter at the second angle of incidence. The number of light bandpass filters required for a multiplexing device is thereby reduced, in some cases to only one light bandpass filter. The same principles may be applied in reverse to form a light combiner or multiplexer.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic drawing of a conventional demultiplexer system;

FIG. 2 is a schematic graph of the transmission of a light bandpass filter as a function of wavelength, for two angles of incidence;

FIG. 4 is a schematic plan view of a second embodiment of an optical multiplexing device according to the invention; and FIG. 5 is a schematic plan view of a third embodiment of an optical multiplexing device according to the invention.

DETAILED DESCRIPTION OF THE INVENTION

Figure 3:
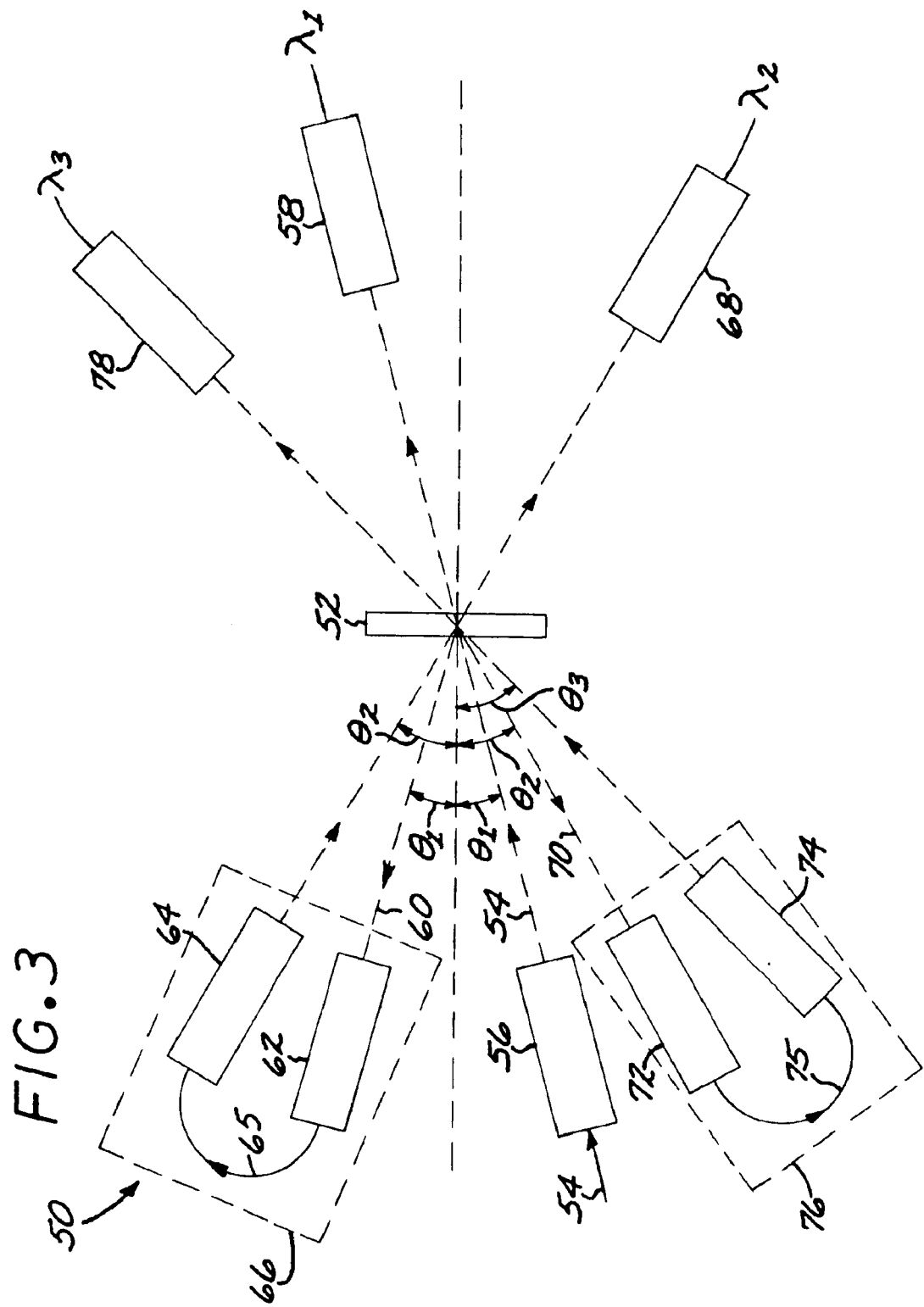
FIG. 3 is a schematic plan view of a first embodiment of an optical multiplexing device according to the invention.

FIG. 1 depicts a conventional demultiplexer 20 for extracting light of a first wavelength $\lambda_1$ and light of a second wavelength $\lambda_1$ from an incoming light beam 22. The demultiplexer 20 includes a first transmitter 24 that directs the light beam 22 onto a first filter 26. The light of wavelength $\lambda_1$ passes through the first light bandpass filter 26 and is received by a first light receiver 28. The remainder of the beam reflects from the first light bandpass filter 26, is received by a first collimator 30, and is conveyed to a second transmitter 32. The beam is transmitted to a second light bandpass filter 34, where the light of wavelength $\lambda_2$ is passed through to a second light receiver 36, and the remainder of the beam is reflected from the second light bandpass filter to a second collimator 38. This process is repeated for each of the wavelengths of light to be extracted from the light beam 22, with a suitable light bandpass filter provided for each wavelength that is extracted.

The present invention uses a light bandpass filter having a substrate and a multilayer dielectric light-transmissive optical stack deposited upon the substrate. Such light bandpass filters are known in the art for other uses, and are described, for example, in U.S. Pat. Nos. 4,244,045 and 5,583,683, whose disclosures are incorporated by reference.

The present inventor has recognized that a property of such light bandpass filters is that the transmitted light intensity as a function of wavelength is dependent upon the angle of incidence of the light beam to the surface of the light bandpass filter, and has applied that recognition to the present invention. FIG. 2 illustrates this property of such light bandpass filters. The transmitted intensity for light incident at Angle 1 is a maximum at about 1538 nanometers wavelength. The transmitted intensity for light incident at Angle 2 is a maximum at about 1537.2 nanometers. By directing a light beam toward the filter surface at Angle 1, the light of about 1538 nanometers wavelength is passed through the filter to a receiver on the other side of the light bandpass filter. The light not transmitted is reflected, and then may be directed toward the filter surface at Angle 2. The light of about 1537.2 nanometers wavelength is passed through the filter to a second receiver on the other side of the light bandpass filter. The process may be repeated for additional wavelengths of light.

FIGS. 3–5 illustrate three embodiments of optical multiplexing devices 50 that utilize this principle. In each case, there is a single light bandpass filter 52 that extracts more than one wavelength of light from an input light beam 54. As used herein, a "multiplexing device" may serve as either a multiplexer that combines and mixes wavelength components into a single light beam, or a demultiplexer that separates out the wavelength components of a single light beam, with appropriate selection of components and light beam path direction. These functions are inverse in nature, except that light sources and light detectors are used as appropriate. The demultiplexing devices 50 of FIGS. 3–5 may therefore serve as demultiplexers, as shown, or as multiplexers with light sources substituted for the light receivers, and the direction of the beam path reversed from that illustrated.

In the demultiplexing embodiment of FIG. 3, the input light beam 54 is directed toward the light bandpass filter 52 by a first collimator 56 at an angle of incidence $\theta_1$ (relative to the normal direction to the light bandpass filter 52). Light of wavelength $\lambda_1$ passes through the light bandpass filter 52 to a first receiver 58, whose output is the signal carried on wavelength $\lambda_1$. The remainder of the light beam 54 reflects as a first reflected light beam 60 from the light bandpass filter 52 at the angle $\theta_1$. The first reflected light beam 60 is collimated by a second collimator 62 and provided to a third collimator 64, via a first optical fiber link 65, that directs the first reflected light beam 60 back toward the same light bandpass filter 52 but at an angle of incidence $\theta_2$. The second collimator 62, the optical fiber link 65, and the third collimator 64 thus function together as a first light receptor and redirector 66.

The light from the third collimator 64 is directed toward the light bandpass filter 52 with an angle of incidence $\theta_2$. Light of wavelength $\lambda_2$ passes through the light bandpass filter 52 to a second receiver 68, whose output is the signal carried on wavelength $\lambda_2$. The remainder of the light beam reflects as a second reflected light beam 70 from the light bandpass filter 52 at the angle $\theta_2$. The second reflected light beam 70 is collimated by a fourth collimator 72 and provided to a fifth collimator 74, via a second optical fiber link 75, that directs the second reflected light beam 70 back toward the same light bandpass filter 52 but at an angle of incidence $\theta_3$. The fourth collimator 72, the optical fiber link 75, and the fifth collimator 74 thus function together as a first light receptor and redirector 76.

The light from the fifth collimator 74 is directed toward the light bandpass filter 52 with an angle of incidence $\theta_3$. Light of wavelength $\lambda_3$ passes through the light bandpass filter 52 to a third receiver 78, whose output is the signal carried on wavelength $\lambda_3$. The remainder of the light beam reflects as a third reflected light beam (not shown) from the light bandpass filter 52 at the angle $\theta_3$. The process may be carried out as many times as necessary, using the same light bandpass filter 52, for the number of light wavelengths to be extracted. The limits on the number of wavelengths extracted arise from the physical space limitations on the number of elements that may be positioned around the light bandpass filter 52 and possibly by the heating of the light bandpass filter by the incident light. In FIG. 3, the angles of incidence $\theta_1$, $\theta_2$, and $\theta_3$, and particularly the differences between the angles, have been exaggerated to aid in presenting the illustration. In practical applications, the differences between the angles are often on the order of 1–2 degrees, and the angles of incidence are made as small as possible to minimize insertion losses.

The embodiment of FIG. 4 is similar to that of FIG. 3, except that provision is made only for extracting two wavelengths $\lambda_1$ and $\lambda_2$, and for the use of mirrors 80 to provide portions of the optical links 82 between collimators. Where appropriate, the same reference numerals have been used in FIG. 4 and in FIG. 3, and the prior description is incorporated into the description of FIG. 4.

In the embodiments of FIGS. 3–4, the optical elements are in a single plane, the plane of the page in the illustrations. When the angles of incidence and the differences between the angles of incidence are small, on the order of a few degrees or less, there may be some difficulty in positioning all of the required optical components so closely together. One solution is to stagger the distances from the light bandpass filter, but even then there may be blocking of some of the light beams due to the sizes of the optical components.

Another solution is illustrated in FIG. 5, whose description incorporates the prior descriptions to the extent applicable. Here, the first collimator 56 and the second collimator 62 are placed in a first plane 90 that intersects the light bandpass filter 52. The third collimator 64 and the fourth collimator 72 are placed in a second plane 92 that intersects the light bandpass filter 52. The second collimator 62 and the third collimator 64 are linked by the first optical fiber link 65, making it possible to position them in different planes 90 and 92. The discussed optical components are all on the incident side of the light bandpass filter 52. There are receivers on the output side of the light bandpass filter 52, but these are not shown in FIG. 5. The planes 90 and 92 may be parallel or nonparallel, and are illustrated as nonparallel. They need not be orthogonal to each other. Multiple optical components and light extraction structures such as shown in FIG. 3 may be placed into each of the planes. With this approach, the space on the half sphere on the incident side of the light bandpass filter 52 and the space on the half sphere on the output side of the light bandpass filter 52 may be used with maximum efficiency.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An optical multiplexing device comprising:
    a light bandpass filter that passes a first light wavelength at a first angle of incidence, passes a second light wavelength at a second angle of incidence, and passes a third light wavelength at a third angle of incidence;
    a light source that directs a first incident beam including light of the first wavelength, light of the second wavelength, and light of the third wavelength at the first angle of incidence onto the light bandpass filter, the light bandpass filter passing the light of the first wavelength therethrough and reflecting a first reflected beam therefrom;
    a first light receptor and redirector that receives the first reflected beam, and redirects the first reflected beam back onto the light bandpass filter at the second angle of incidence as a second incident beam, the light bandpass filter passing the light of the second wavelength therethrough and reflecting a second reflected beam therefrom; and
    a second light receptor and redirector that receives the second reflected beam and redirects the second reflected beam back onto the light bandpass filter at the third angle of incidence as a third incident beam, the light bandpass filter passing the light of the third wavelength therethrough and reflecting a third reflected beam therefrom, wherein the first incident beam, the second incident beam, and the third incident beam are not coplanar.

2. The optical multiplexing device of claim 1, further including
    a first light receiver positioned to receive the light of the first wavelength after it passes through the light bandpass filter, and
    a second light receiver positioned to receive the light of the second wavelength after it passes through the light bandpass filter.

3. The optical multiplexing device of claim 1, wherein the first light receptor and redirector comprises
    a receiving collimator positioned to receive the first reflected beam,
    a redirecting collimator positioned to transmit the second incident beam, and
    an optical link from the receiving collimator to the redirecting collimator.

4. The optical multiplexing device of claim 3, wherein the optical link comprises a mirror.

5. The optical multiplexing device of claim 3, wherein the optical link comprises an optical fiber.

6. An optical multiplexing device comprising:
    a light bandpass filter comprising a substrate and a multilayer dielectric light-transmissive optical stack deposited upon the substrate;
    a light source that directs an incident beam including light of a first wavelength and light of a second wavelength onto the light bandpass filter at a first angle of incidence, the light bandpass filter passing the light of the first wavelength therethrough and reflecting a first reflected beam therefrom; and
    a light receptor and redirector that receives the reflected beam and redirects the first reflected beam back onto the light bandpass filter at a second angle of incidence, the light bandpass filter passing the light of the second wavelength therethrough and reflecting a second reflected beam therefrom, wherein the light receptor comprises
        a receiving collimator positioned to receive the first reflected beam,
        a redirecting collimator positioned to transmit the second incident beam, and
        an optical link from the receiving collimator to the redirecting collimator, wherein the optical link comprises a mirror.

7. The optical multiplexing device of claim 6, further including
    a first light receiver positioned to receive the light of the first wavelength after it passes through the light bandpass filter, and
    a second light receiver positioned to receive the light of the second wavelength after it passes through the light bandpass filter.

8. The optical multiplexing device of claim 6, wherein the light bandpass filter passes a third light wavelength at a third angle of incidence, the incident beam includes light of the third wavelength, and the optical multiplexing device further includes a second light receptor and redirector that receives the second reflected beam and redirects the second reflected beam back onto the light bandpass filter at the third angle of incidence as a third incident beam, the light bandpass filter passing the light of the third wavelength therethrough and reflecting a third reflected beam therefrom.

9. The optical multiplexing device of claim 8, wherein the first incident beam, the second incident beam, and the third incident beam are coplanar.

10. The optical multiplexing device of claim 8, wherein the first incident beam, the second incident beam, and the third incident beam are not coplanar.

* * * * *